US011272072B2

United States Patent
Shiotani

(10) Patent No.: US 11,272,072 B2
(45) Date of Patent: Mar. 8, 2022

(54) COMPUTER-READABLE MEDIUM, INFORMATION PROCESSING DEVICE, AND METHOD FOR DISPLAYING IMAGE FILE RETRIEVED ACCORDING TO FILE PATH

(71) Applicant: Brother Kogyo Kabushiki Kaisha, Nagoya (JP)

(72) Inventor: Takeshi Shiotani, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/346,520

(22) Filed: Jun. 14, 2021

(65) Prior Publication Data
US 2021/0409567 A1    Dec. 30, 2021

(30) Foreign Application Priority Data

Jun. 30, 2020 (JP) .............................. JP2020-113269

(51) Int. Cl.
*H04N 1/21* (2006.01)
*H04N 1/32* (2006.01)
*H04N 1/00* (2006.01)

(52) U.S. Cl.
CPC ....... *H04N 1/2183* (2013.01); *H04N 1/00766* (2013.01); *H04N 1/00782* (2013.01); *H04N 1/32128* (2013.01)

(58) Field of Classification Search
CPC ............. H04N 1/0009; H04N 1/00766; H04N 1/00782; H04N 1/32128; H04N 1/2166; H04N 1/2183; H04N 2201/0087; H04N 2201/0094; H04N 2201/3274; H04N 2201/3287; H04N 2201/3298
USPC ............................... 358/1.15, 1.18, 403, 474
See application file for complete search history.

(56) References Cited

U.S. PATENT DOCUMENTS

2010/0005136 A1 * 1/2010 Ferlitsch ............ H04N 1/00225
709/203
2018/0364963 A1   12/2018 Mihira

FOREIGN PATENT DOCUMENTS

JP        2019-008370 A      1/2019

* cited by examiner

*Primary Examiner* — Kent Yip
(74) *Attorney, Agent, or Firm* — Burr & Brown, PLLC

(57) ABSTRACT

A non-transitory computer-readable medium stores computer-readable control program instructions configured to, when executed, cause an information processing device to obtain an image file, store the image file in association with related information, generate a file path for the image file, the file path including a plurality of virtual directories based on the related information, the plurality of virtual directories belonging to respective different hierarchical layers, and in response to receiving, from browser program instructions stored in the information processing device, a request for one or more virtual directories belonging to a first lower layer that is hierarchically one level lower than a specified virtual directory in a top layer, retrieve and send the one or more virtual directories to the browser program instructions, thereby enabling the browser program instructions to display the retrieved one or more virtual directories belonging to the first lower layer.

13 Claims, 9 Drawing Sheets

COMPUTER-READABLE MEDIUM, INFORMATION PROCESSING DEVICE, AND METHOD FOR DISPLAYING IMAGE FILE RETRIEVED ACCORDING TO FILE PATH

CROSS-REFERENCE TO RELATED APPLICATION

This application claims priority under 35 U.S.C. § 119 from Japanese Patent Application No. 2020-113269 filed on Jun. 30, 2020. The entire subject matter of the application is incorporated herein by reference.

BACKGROUND

Technical Field

Aspects of the present disclosure are related to a non-transitory computer-readable medium, an information processing device, and a method for displaying an image file retrieved according to a file path for the image file.

Related Art

File browsing has been known as a function to display image files stored in an information processing device. For instance, an information processing device has been disclosed that is configured to display a user-desired image file through file browsing provided by an external program.

SUMMARY

In general, an application program, which is configured to, when executed by an information processing device, cause the information processing device to instruct an image processing device to generate an image file, has a function to display the image file generated via the application program. On the other hand, there are cases where the image file generated via the application program is displayed using file browsing provided by an external program (i.e., a program different from the application program for controlling the image processing device). In such cases, the file browsing provided by the external program does not have any functions specific to the application program, and might be less user-friendly than when the image file generated via the application program is displayed using the application program.

Aspects of the present disclosure are advantageous to provide one or more improved techniques to suppress the user-friendliness for displaying an image file from being worse even when the image file is displayed using a function provided by an external program.

According to aspects of the present disclosure, a non-transitory computer-readable medium is provided, which stores computer-readable instructions executable by a processor of an information processing device including an input interface, a display, and a memory storing computer-readable browser program instructions. The control program instructions are configured to, when executed by the processor, cause the information processing device to obtain an image file generated by an image processing device, store the obtained image file in association with related information of the image file, and generate a file path for the image file. The file path includes, as elements thereof, a plurality of virtual directories based on the related information. The plurality of virtual directories belong to respective different hierarchical layers. The file path includes identification information of the image file as a virtual directory belonging to a lowest layer. The browser program instructions are configured to, when executed by the processor, cause the information processing device to display on the display one or more virtual directories belonging to a top layer, and when receiving via the input interface an operation to specify a virtual directory included in the file path for the image file from among the displayed one or more virtual directories belonging to the top layer, send to the control program instructions a request for one or more virtual directories belonging to a first lower layer that is hierarchically one level lower than the specified virtual directory in the top layer. The control program instructions are further configured to, when executed by the processor, cause the information processing device to, in response to receipt of the request for the one or more virtual directories belonging to the first lower layer, retrieve the requested one or more virtual directories and send the retrieved one or more virtual directories to the browser program instructions, thereby enabling the browser program instructions to cause the information processing device to display the one or more virtual directories belonging to the first lower layer.

According to aspects of the present disclosure, further provided is an information processing device that includes an input interface, a display, and a controller. The controller includes a processor, and a memory storing computer-readable control program instructions and computer-readable browser program instructions. The control program instructions are configured to, when executed by the processor, cause the controller to obtain an image file, store the obtained image file in association with related information of the image file, and generate a file path for the image file. The file path includes, as elements thereof, a plurality of virtual directories based on the related information. The plurality of virtual directories belong to respective different hierarchical layers. The file path includes identification information of the image file as a virtual directory belonging to a lowest layer. The browser program instructions are configured to, when executed by the processor, cause the controller to display on the display one or more virtual directories belonging to a top layer, and when receiving via the input interface an operation to specify a virtual directory included in the file path for the image file from among the displayed one or more virtual directories belonging to the top layer, send to the control program instructions a request for one or more virtual directories belonging to a first lower layer that is hierarchically one level lower than the specified virtual directory in the top layer. The control program instructions are further configured to, when executed by the processor, cause the controller to, in response to receipt of the request for the one or more virtual directories belonging to the first lower layer, retrieve the requested one or more virtual directories and send the retrieved one or more virtual directories to the browser program, thereby enabling the browser program to cause the controller to display the one or more virtual directories belonging to the first lower layer.

According to aspects of the present disclosure, further provided is a method implementable on a processor of an information processing device including an input interface, a display, and a memory storing computer-readable control program instructions and computer-readable browser program instructions. The method includes, by executing the control program instructions, performing obtaining an image file, storing the obtained image file in association with related information of the image file, and generating a file path for the image file, the file path including, as elements thereof, a plurality of virtual directories based on the related information. The plurality of virtual directories belong to respective different hierarchical layers. The file path includes identification information of the image file as a virtual directory belonging to a lowest layer. The method further includes, by executing the browser program instructions, performing displaying on the display one or more virtual directories belonging to a top layer, and when receiving via the input interface an operation to specify a virtual directory included in the file path for the image file from among the displayed one or more virtual directories belonging to the top layer, sending to the control program instructions a request for one or more virtual directories belonging to a first lower layer that is hierarchically one level lower than the specified virtual directory in the top layer, and by executing the control program instructions, further performing, in response to receipt of the request for the one or more virtual directories belonging to the first lower layer, retrieving the requested one or more virtual directories and sending the retrieved one or more virtual directories to the browser program, thereby enabling the processor to, by executing the browser program, display the one or more virtual directories belonging to the first lower layer.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

A scanning system of a first illustrative embodiment according to aspects of the present disclosure will be described with reference to relevant drawings.

Figure 1:
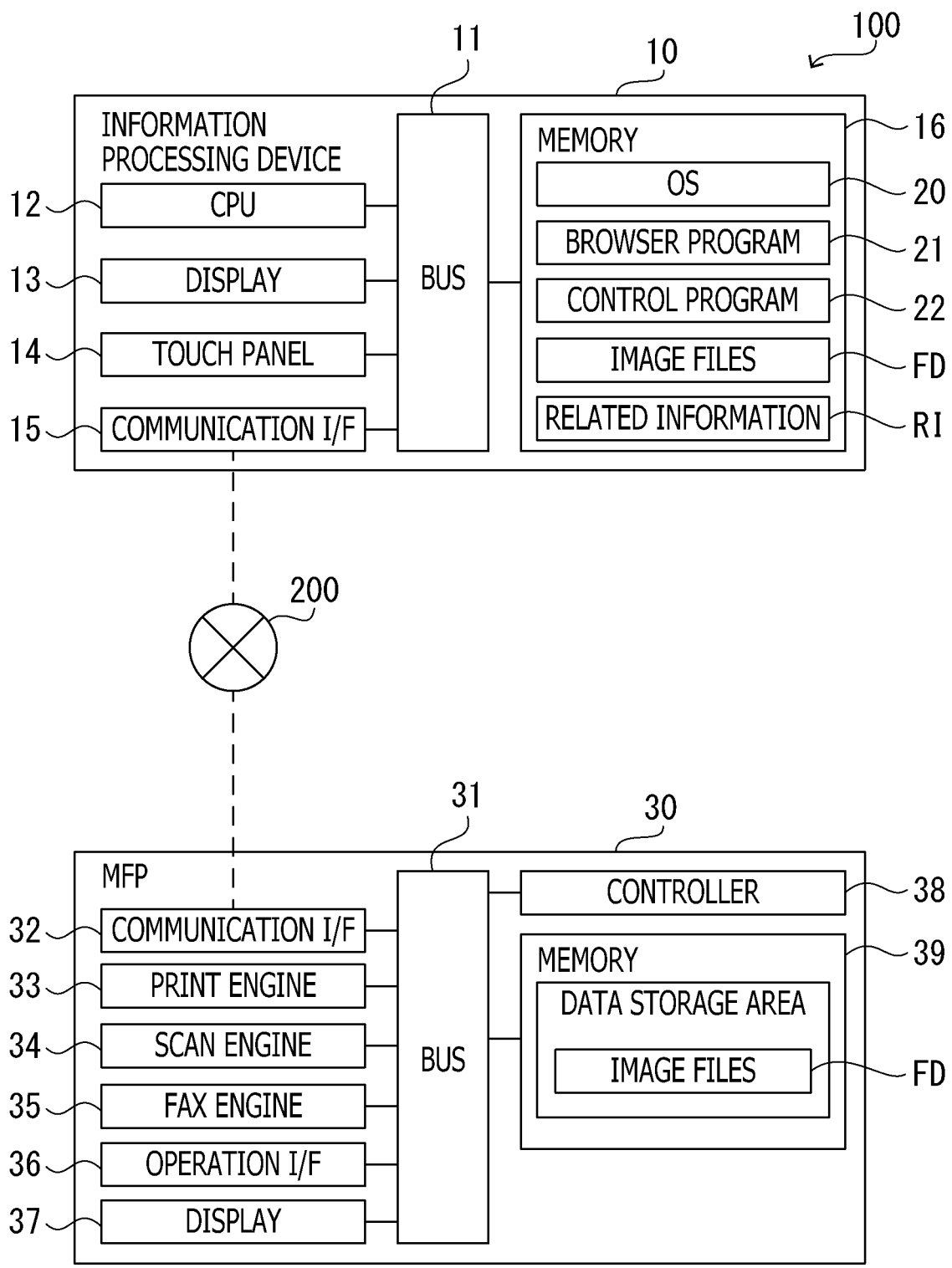
FIG. 1 is a block diagram showing a configuration of a scanning system including an information processing device and an MFP ("MFP" is an abbreviation for "Multi-Function Peripheral/Printer/Product"), in a first illustrative embodiment according to one or more aspects of the present disclosure.

A scanning system 100 shown in FIG. 1 includes an information processing device 10 and an MFP ("MFP" is an abbreviation for "Multi-Function Peripheral/Printer/Product") 30. The information processing device 10 and the MFP 30 are connected with a network 200. In the first illustrative embodiment, the network 200 may include at least one of the Internet and a local area network (hereinafter referred to as a "LAN"). In addition, the network 200 may include at least one of a wired network and a wireless network. In the first illustrative embodiment, the information processing device 10 and the MFP 30 are connected wirelessly via a router (not shown) included in the network 200.

A hardware configuration of the MFP 30 will be described. The MFP 30 includes a bus 31, a communication I/F ("I/F" is an abbreviation for "interface") 32, a print engine 33, a scan engine 34, a fax engine 35, an operation I/F 36, a display 37, a controller 38, and a memory 39. These elements included in the MFP 30 are communicably interconnected via the bus 31.

The communication I/F 32 is configured to connect the MFP 30 with the network 200 therethrough in compliance with a particular communication protocol. The operation I/F 36 is an interface configured to display operable icons for accepting user operations and provide the controller 38 with an input according to a user operation accepted via one of the operable icons. The controller 38 is configured to control operations by the print engine 53, the scan engine 54, the fax engine 55, and the display 57.

The print engine 33 is configured to perform a printing operation to print an image on a recording medium such as a sheet or a disk. Specifically, the controller 38 analyzes job data transmitted by the information processing device 10 and prints an image by discharging ink onto the recording medium. Applicable recording methods for the print engine 33 may include, but are not limited to, an inkjet method to discharge ink onto a recording medium, and an electrophotographic method to form a toner image on a photoconductive body and transfer the formed toner image onto a recording medium. The scan engine 34 is configured to perform a scanning operation to scan an image recorded on a document and generate an image file FD. The controller 38 is configured to cause the scan engine 34 to scan a document placed on an ADF ("ADF" is an abbreviation for "Automatic Document Feeder") or a flatbed and generate an image file FD, and to transmit the generated image file FD to the information processing device 10 via the communication I/F 32. The image file FD generated in the scanning operation is temporarily stored in the memory 39. The fax engine 35 is configured to send and receive image data in a method compliant with a fax protocol. The MFP 30 may be configured to perform a combined operation including a plurality of operations. A copy operation including a printing operation by the print engine 33 and a scanning operation by the scan engine 34 may be an example of the combined operation.

The operation I/F 36 is configured to accept a user operation therethrough and transmit to the controller 38 a signal according to the accepted user operation. The controller 38 includes at least one of a CPU ("CPU" is an abbreviation for "Central Processing Unit") and an ASIC ("ASIC" is an abbreviation for "Application Specific Integrated Circuit"). The controller 38 is configured to control each element included in the MFP 30. The memory 39 includes at least one of a RAM ("RAM" is an abbreviation for "Random Access Memory"), a ROM ("ROM" is an abbreviation for "Read Only Memory"), and a flash memory. The memory 39 stores various programs executable by the controller 38.

Next, a configuration of the information processing device 10 will be described. Examples of the information processing device 10 may include, but are not limited to, a smart phone and a tablet terminal. The information processing device 10 includes a bus 11, a CPU 12, a display 13, a touch panel 14, a communication I/F 15, and a memory 16. These elements included in the information processing device 10 are communicably interconnected via the bus 11.

The display 13 has a display surface for displaying one or more screens. The touch panel 14 has a touch sensor, and is disposed to cover the display surface of the display 13. The touch panel 14 is configured to detect a user's touch operation and output an electrical signal in response to the detection. A concept of "touch" in the first illustrative embodiment may include all operations of bringing an input medium into contact with the display screen. Specifically, a tap operation of releasing a touching input medium from the touch panel 14 within a particular period of time will be described as an example of "touch." However, the concept of "touch" may include, but is not limited to, a long touch operation, a slide operation, a flick operation, a pinch-in operation, and a pinch-out operation. In addition, the concept of "touch" may include an operation of bringing the input medium within a very short distance from the touch panel 14. Furthermore, examples of the input medium may include, but are not limited to, a user's finger, a stylus, and a touch pen. In the first illustrative embodiment, the touch panel 14 may be an example of an "input interface" according to aspects of the present disclosure. The information processing device 10 may include physically provided operable keys as the "input interface."

For instance, the communication I/F 15 is configured to perform Wi-Fi® (registered trademark) wireless communication based on the IEEE 802.11 standards and equivalent standards. In another instance, the communication I/F 15 may be configured to perform short-range wireless communication such as Bluetooth (registered trademark) with the MFP 30, or perform wireless communication using a mobile communication system via a base station.

The CPU 12 is configured to control each element included in the information processing device 10 by executing one or more programs stored in the memory 16. The memory 16 includes a RAM, a ROM, and a flash memory. Further, the memory 16 may include a computer-readable storage medium. Examples of the computer-readable storage medium may include, but are not limited to, recording media such as a CD-ROM and a DVD-ROM.

The memory 16 stores an OS ("OS" is an abbreviation for "Operating System") 20, a browser program 21, and a control program 22. The control program 22 is prepared, for instance, by a vendor of the MFP 30 and installed into the information processing device 10 from an application providing server (not shown) via the network 200. The CPU 12 and the memory 16 storing computer-readable instructions such as the OS 20, the browser program 21, and the control program 22 may form a controller to control each element included in the information processing device 10. In the following description, a CPU executing a program may be simply referred to with a name of the program. For instance, a description "the control program 22" may represent "the CPU 12 executing the control program 22." Some of the functions provided by the browser program 21 and the control program 22 may be achieved using functions of the OS 20.

In the first illustrative embodiment, processes by the CPU 12 and the controller 38 according to instructions described in programs are basically shown. Namely, processes such as "judging," "extracting," "selecting," "calculating," "determining," "specifying," "identifying," "obtaining," "accepting," "receiving," "controlling," and "setting" in the following description may represent processes by the CPU 12 and the controller 38. The processing by the CPU 12 may include hardware control via the OS 20. It is noted that "obtaining" may be used as a concept that does not necessarily require a request. Namely, for instance, a process of the control program 22 receiving data without making a request may be included in a concept of "the CPU 12 obtains data." Further, "data" in the following description may be expressed in a computer-readable format. Additionally, a plurality of pieces of data having substantially the same meaning or content but expressed in different formats shall be treated as the same data. The same applies to "information" in the following description.

The OS 20 has an API ("API" is an abbreviation for "Application Programming Interface") that enables the control program 22 to use functions of the OS 20 and communicate with the browser program 21. Examples of the OS 20 may include, but are not limited to, Android (registered trademark) and iOS (registered trademark).

The browser program 21 is a so-called file browser program for displaying directories and files that are accessible by user's touch operations. Specifically, when Android (registered trademark) is used as the OS 20, Documents Provider is used as the browser program 21. When iOS is used as the OS 20, File Provider Extension is used as the browser program 21.

The control program 22 is a program for causing the MFP 50 connectable via the communication I/F 15 to perform printing, scanning, faxing, and other operations. In the first illustrative embodiment, the control program 22 is launched in response to a startup icon for activating the control program 22 being touched on the display 13 of the information processing device 10.

The control program 22 has a function "Scan Result Display," which is a function to display on the display 13 an image file FD generated in a scanning operation by the MFP 30. This function makes it possible to display on the display 13 the image file FD generated in the scanning operation and then stored in the memory 16 along with a file name of the image file FD and the generation date and time when the image file FD was generated. In other words, the information processing device 10 may display the image file FD by the function "Scan Result Display" of the control program 22, or may display the image file FD by the browsing function of the browser program 21.

Figure 2:
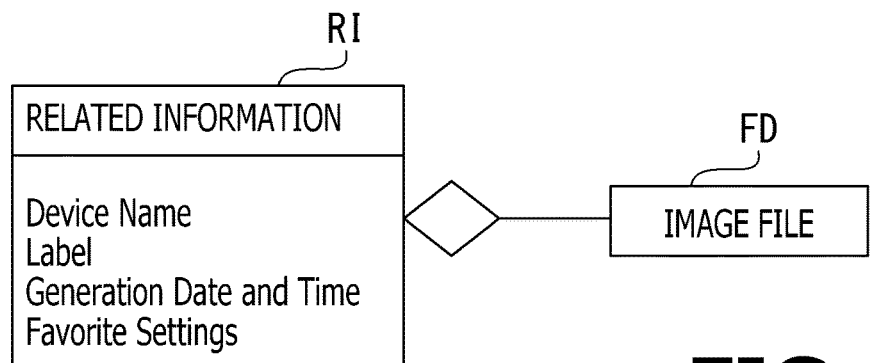
FIG. 2 shows a relationship between an image file and related information, in the first illustrative embodiment according to one or more aspects of the present disclosure.

The memory 16 stores the image file FD transmitted by the MFP 30, in association with related information RI of the image file FD. The related information RI contains items related to the image file FD. Specifically, as shown in FIG. 2, the related information RI contains a plurality of items such as "Device Name," "Label," "Generation Date and Time," and "Favorite Settings." The "Device Name" is information that indicates a device that generated the image file FD. For instance, a device name "MFC1" of the MFP 30 is registered as the "Device Name." The "Label" is information for identifying the image file FD. In the first illustrative embodiment, a file name of the image file FD is registered as the "Label." The "Generation Date and Time" is the date and time when the image file FD was saved on the information processing device 10. The "Favorite Settings" is information representing that the image file FD is registered with favorite settings, when the user has registered the image file FD with the favorite settings.

The control program 22 generates a file path for the image file FD stored in the memory 16, with each item included in the related information RI as a virtual directory. As will be described below with reference to FIGS. 5 to 8, the control program 22 is configured to cause the browser program 21 to display on the display 13 each virtual directory included in the generated file path on the display 13 together with a name of each virtual directory. Thereby, the user is allowed to search for the image file FD by touching and operating the individual virtual directories displayed on the display 13.

Figure 3:
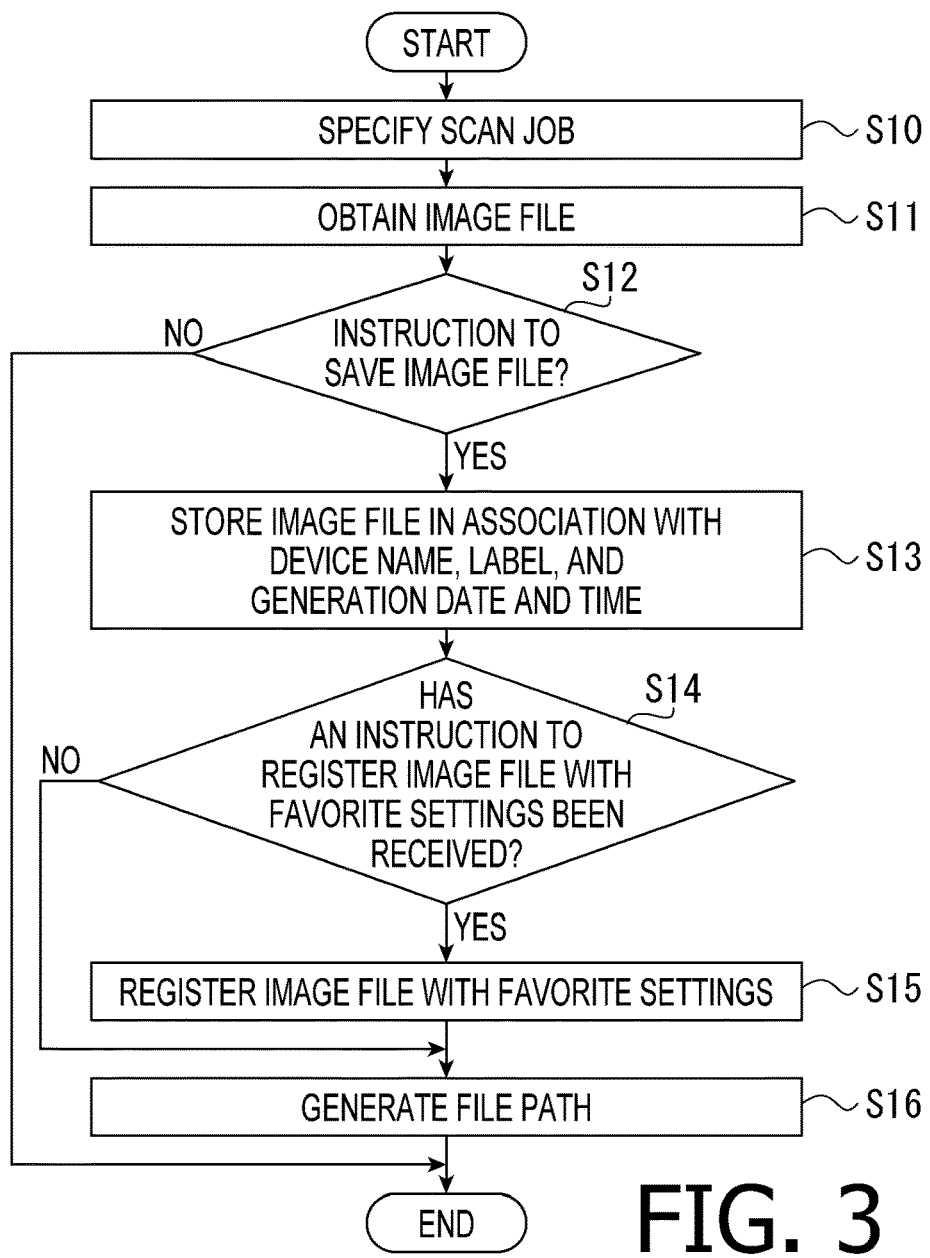
FIG. 3 is a flowchart showing a procedure to obtain the image file, store the image file in association with the related information, and generate a file path for the image file, in the first illustrative embodiment according to one or more aspects of the present disclosure.

First, an explanation will be provided of a procedure in which the control program 22 (more exactly, the CPU 12 executing the control program 22) generates the related information RI and the file path, with reference to FIG. 3. Each of the processes shown in FIG. 3 is a process to be performed by the control program 22. More specifically, each process in FIG. 3 is a process to be performed by the CPU 12 executing the control program 22, when the CPU 12 accepts, via the touch panel 14, an instruction to cause the MFP 30 to perform a scanning operation.

In S10, the CPU 12 specifies a scan job for the MFP 30. The scan job includes setting information for causing the MFP 30 to perform the scanning operation. The setting information is, for instance, information for setting a scanning mode (duplex or simplex) for scanning a document, a scanning range (e.g., A4 or A3) for the document, a resolution, and a color setting (color or monochrome). When receiving a scan job from the information processing device 10 via the network 200, the controller 38 of the MFP 30 starts the scanning operation according to the settings included in the scan job. The controller 38 transmits an image file FD generated in the scanning operation, to the information processing device 10 via the network 200. In this example, it is assumed that a single image file FD is generated in the scanning operation, for the sake of simple explanation. However, it is noted that a plurality of image files FD may be generated in the scanning operation.

In S11, the CPU 12 obtains the image file FD transmitted by the MFP 30. In S12, the CPU 12 determines whether a user instruction to save the image file FD has been received via the touch panel 14. When determining that a user instruction to save the image file FD has not been received (S12: No), the CPU 12 terminates the process shown in FIG. 3. In this case, the image file FD is not saved, and therefore, the related information RI is not generated. Meanwhile, when determining that a user instruction to save the image file FD has been received (S12: Yes), the CPU 12 goes to S13.

In S13, the CPU 12 saves the image file FD, and also stores a setting value for each of the items "Device Name," "Label," and "Generation Date and Time" included in the related information RI, in association with the image file FD. Specifically, as the "Device Name," the CPU 12 stores "MFC1" that is the device name of the MFP 30. As the "Label," the CPU 12 stores a saving name specified by the user when the image file FD is saved is stored. As the "Generation Date and Time," the CPU 12 stores the date and time when the image file FD was saved.

In S14, the control program 22 (more exactly, the CPU 12 executing the control program 22) determines whether a user instruction to register the image file FD with the favorite settings has been received via the touch panel 14. When determining that a user instruction to register the image file FD with the favorite settings has not been received (S14: No), the control program 22 goes to S16. In this case, information representing that the image file FD is registered with the favorite settings is not stored as the "Favorite Settings" in the related information RI. Meanwhile, when determining that a user instruction to register the image file FD with the favorite settings has been received (S14: Yes), the control program 22 proceeds to S15 and stores the information representing that the image file FD is registered with the favorite settings, as the "Favorite Settings" in the related information RI.

In S16, the control program 22 generates a file path for the image file FD to be saved, using the related information RI generated in S13 and S15. The file path is information that virtually indicates a location of the image file FD in the memory 16. The file path has a plurality of virtual directories as elements. After completion of S16, the control program 22 terminates the process shown in FIG. 3. The process of S16 will be described in detail later.

Figure 4:
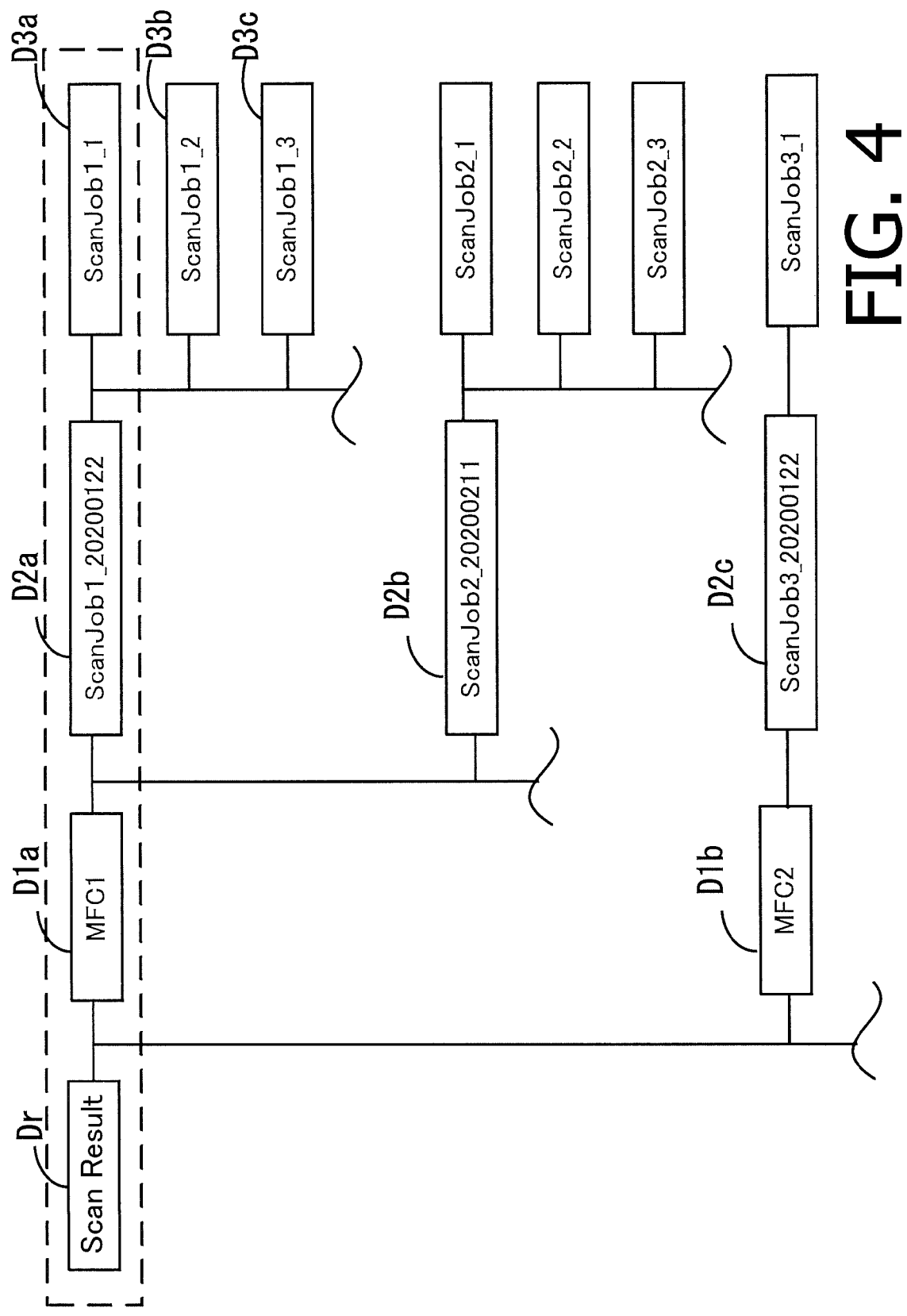
FIG. 4 shows a directory structure including file paths for image files stored in the information processing device, in the first illustrative embodiment according to one or more aspects of the present disclosure.

FIG. 4 illustrates an example of the file path generated by the CPU 12 executing the control program 22 in S16. FIG. 4 shows a directory structure including file paths for image files stored in the memory 16. For instance, in the directory structure shown in FIG. 4, the file path generated for the image file FD (ScanJob1_1) is surrounded by a dashed line. The directory structure shown in FIG. 4 is a multi-layered tree structure, i.e., a hierarchical structure that has root directories Dr as a top layer, and further has lower layers such as first directories D1, second directories D2, and file directories D3. In the following description, to distinguish between the directories or the image files in the same layer of the directory structure, an alphabetic character (e.g., "a," "b," "c," . . . ) is added to the end of reference characters for each directory or each image file. It is noted that FIG. 4 shows only one root directory Dr for the sake of simple illustration, although the directory structure has a plurality of root directories Dr associated with below-mentioned root directory images 44, 45, and 46 (see FIG. 5).

In the file path generated in S16, the control program 22 (more exactly, the CPU 12 executing the control program 22) sets a name corresponding to the name of the function provided by the control program 22 as a directory name of a corresponding root directory Dr. Specifically, in the first illustrative embodiment, the control program 22 sets "Scan Result" corresponding to the name of the function "Scan Result Display" to display an image file on the display 13, as the directory name of the root directory Dr.

In the file path generated in S16, the control program 22 sets the device name of the device that generated the image file FD, as a directory name of the first directory D1 that belongs to a layer one level lower than the root directory Dr in the hierarchical directory structure (see FIG. 4). Specifically, the control program 22 sets the device name included in the related information RI as the directory name of the first directory D1. In FIG. 4, first directories D1a and D1b are generated with the device names "MFC1" and "MFC2" included in the related information RI as their directory names, respectively.

In the file path generated in S16, the control program 22 sets a name of a job for the image file FD as the directory name of the second directory D2 that belongs to a layer one level lower than the first directory D1 in the hierarchical directory structure (see FIG. 4). Specifically, the control program 22 sets a job name with the generation date added to the label contained in the related information RI of the image file FD, as the directory name of the second directory D2. In FIG. 4, second directories D2a, D2b, and D2c are generated with job names "ScanJob1_20200122," "ScanJob2_20200211," and "ScanJob3_20200122" as their directory names, respectively. Thereby, image files FD, generated by the same image processing device processor and having the same generation date, belong to the same second directory D2. Therefore, the user is allowed to identify the second directory D2 for the image file FD based on the generation date as information specific to the image file FD. It is noted that in the first illustrative embodiment, for instance, as shown in FIG. 4, the job name is set by adding, to the label, only the generation date of the "Generation Date and Time" included in the related information RI. However, the job name may be set by adding, to the label, the generation date and time as is.

In the file path generated in S16, the control program 22 sets the file name of the image file FD as the directory name of the file directory D3 that belongs to a layer one level lower than the second directory D2 in the hierarchical directory structure (see FIG. 4). Specifically, the control program 22 sets a name with a serial number added to the label contained in the related information RI of the image file FD, to the file name of the image file FD as the directory name of the file directory D3. In FIG. 4, file directories D3a, D3b, and D3c are generated with file names "ScanJob1_1," "ScanJob1_2," and "ScanJob1_3" as their directory names, respectively. Thereby, the user is allowed to identify the file directory D3 for the image file FD based on the serial number that is information specific to the image file FD.

Figure 5:
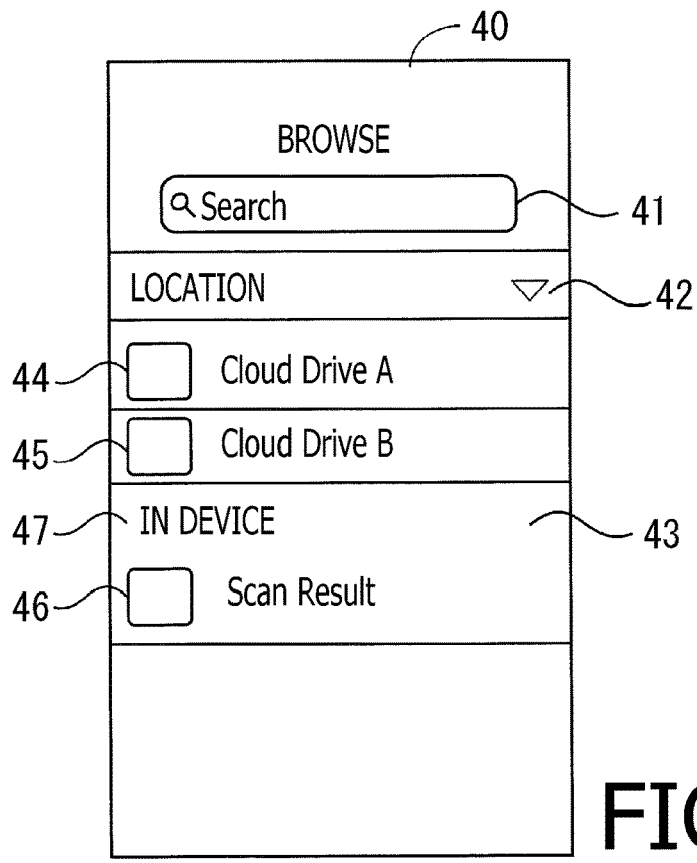
FIG. 5 shows a browser screen including root directory images each displayed in association with a directory name of a corresponding root directory, in the first illustrative embodiment according to one or more aspects of the present disclosure.

Subsequently, referring to FIGS. 5 to 7, an explanation will be provided of browser screens on which the browser program 21 causes the display 13 to display directories in accordance with the file path generated by the control program 22. FIG. 5 shows an example of a browser screen 40 displayed on the display 13 by the browser program 21 (more exactly, the CPU 12 executing the browser program 21) in response to an icon for launching the browser program 21 being touched on the display 13.

The browser screen 40 shown in FIG. 5 includes a search box 41 and a designation area 43. For instance, when the user touches a drop-down icon 42, the designation area 43 is displayed in a drop-down manner on the browser screen 40. In the designation area 43, root directory images 44, 45, and 46 are displayed in association with their corresponding directory names. Each of the root directory images 44, 45, and 46 is configured to receive a user operation to specify a storage location where an intended image file FD is managed.

The root directory images 44 and 45 are icons each of which is configured to receive a touch operation by the user in an attempt to display image files FD managed on a corresponding cloud server (not shown). Specifically, for instance, when the user touches the root directory image 44, the browser program 21 starts communication with an application program (not shown) through the API of the OS 20. The application program communicates with the cloud server via the communication I/F 15 to obtain, from the cloud server, thumbnail images of the image files FD managed on the cloud server, and sends the obtained thumbnail images to the browser program 21. Then, the browser program 21 displays a list of the obtained thumbnail images on the display 13. Since substantially the same as described about the root directory image 44 applies to the root directory image 45, an explanation of the root directory image 45 is omitted.

The root directory image 46 is an icon for receiving a touch operation by the user in an attempt to display an image file FD managed on the memory 16 by the function "Scan Result Display" of the control program 22. In FIG. 5, in the designation area 43, a text 47, which represents that an image file FD managed in the information processing device 10 (i.e., on the memory 16) is to be displayed, is displayed near the root directory image 46. The root directory image 46 is an icon corresponding to the root directory Dr in the hierarchical directory structure shown in FIG. 4. Therefore, when the user touches the root directory image 46, the browser program 21 displays on the display 13 the first directories D1 that belong to the layer one level lower than the root directory Dr shown in FIG. 4, according to an instruction by the control program 22.

Figure 6:
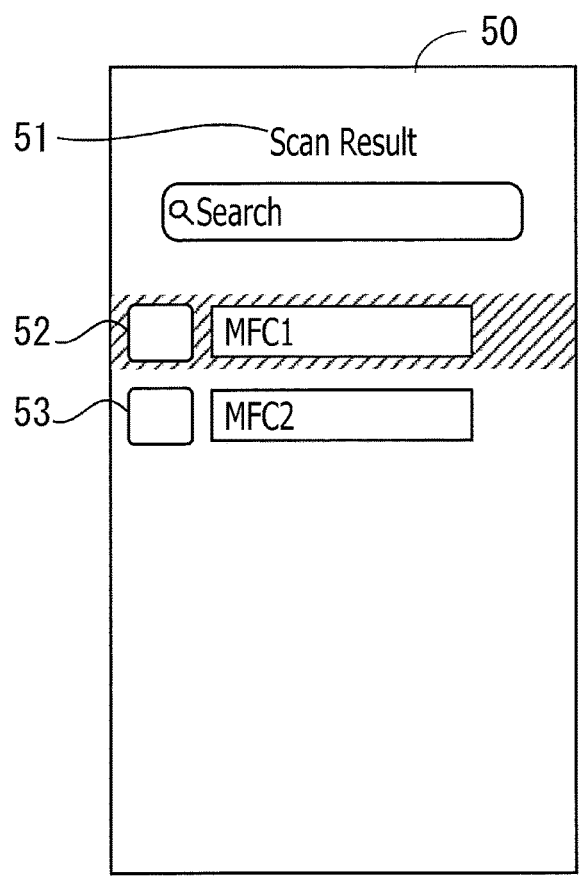
FIG. 6 shows a browser screen including first directory images each displayed in association with a directory name (i.e., a device name) of a corresponding first directory, in the first illustrative embodiment according to one or more aspects of the present disclosure.

FIG. 6 shows an example of a browser screen 50 displayed on the display 13 by the browser program 21 in response to the root directory image 46 being touched on the browser screen 40 (see FIG. 5). The browser screen 50 includes a directory display area 51 and first directory images 52 and 53. The directory display area 51 is for showing the directory name of the root directory Dr specified by the user. Each of the first directory images 52 and 53 is configured to receive a user operation to specify a corresponding one of the first directories D1 that belong to the layer one level lower than the specified root directory Dr in the hierarchical directory structure (see FIG. 4). In FIG. 6, the directory display area 51 displays therein "Scan Result" that is the directory name of the root directory Dr specified by the user. The first directory images 52 and 53 correspond to the first directories D1a and D1b in the hierarchical directory structure (see FIG. 4), respectively. Specifically, in the first directory images 52 and 53, "MFC1" and "MFC2" are displayed, which are the directory names of the corresponding first directories D1a and D1b, respectively, in the hierarchical directory structure (see FIG. 4).

When the user touches one of the first directory images 52 and 53, the browser program 21 displays on the display 13 a browser screen to receive a user operation to specify one of the second directories D2 that belong to the layer one level lower than the first directory D1 specified by the user.

Figure 7:
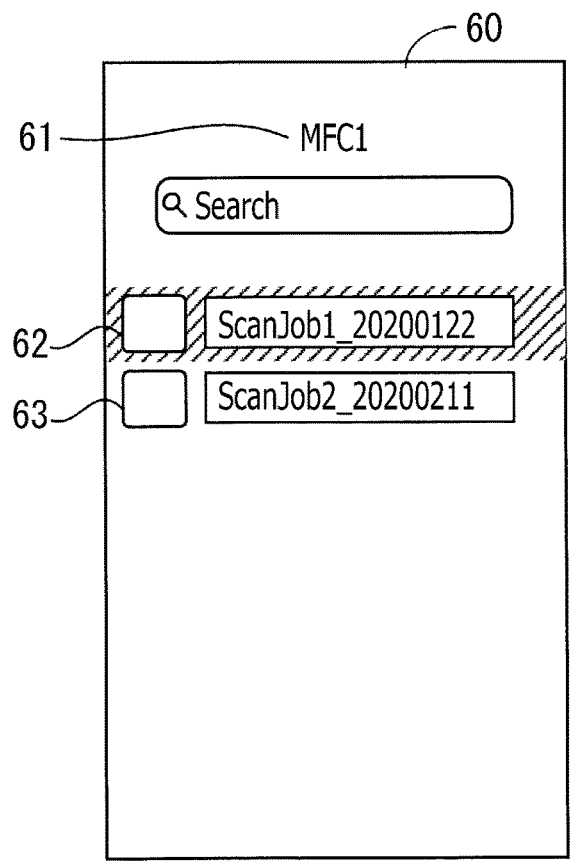
FIG. 7 shows a browser screen including second directory images each displayed in association with a directory name (i.e., a job name) of a corresponding second directory, in the first illustrative embodiment according to one or more aspects of the present disclosure.

FIG. 7 shows an example of a browser screen 60 displayed on the display 13 by the browser program 21 in response to the first directory image 52 being touched on the browser screen 50 (see FIG. 6). The browser screen 60 includes a directory display area 61 and second directory images 62 and 63. The directory display area 61 is for showing the directory name (i.e., the device name) of the first directory D1 specified by the user. Each of the second directory images 62 and 63 is configured to receive a user operation to specify a corresponding one of the second directories D2 that belong to the layer one level lower than the first directory D1 specified by the user. In FIG. 7, the directory name "MFC1" of the first directory D1a (see FIG. 4) specified by the user is displayed in the directory display area 61. The second directory images 62 and 63 correspond to the second directories D2a and D2b, respectively, which belong to the layer one level lower than the first directory D1a in the hierarchical directory structure (see FIG. 4). In each of the second directory images 62 and 63, the job name is displayed, which is the directory name of a corresponding one of the second directories D2a and D2b. Specifically, in the second directory images 62 and 63, "ScanJob1_20200122" and "ScanJob2_20200211" are displayed, which are the directory names of the corresponding second directories D2a and D2b, respectively, in the hierarchical directory structure shown in FIG. 4.

When the user touches one of the second directory images 62 and 63, the browser program 21 displays on the display 13 a browser screen to receive a user operation to specify one of the file directories D3 that belong to the layer one level lower than the second directory D2 specified by the user.

Figure 8:
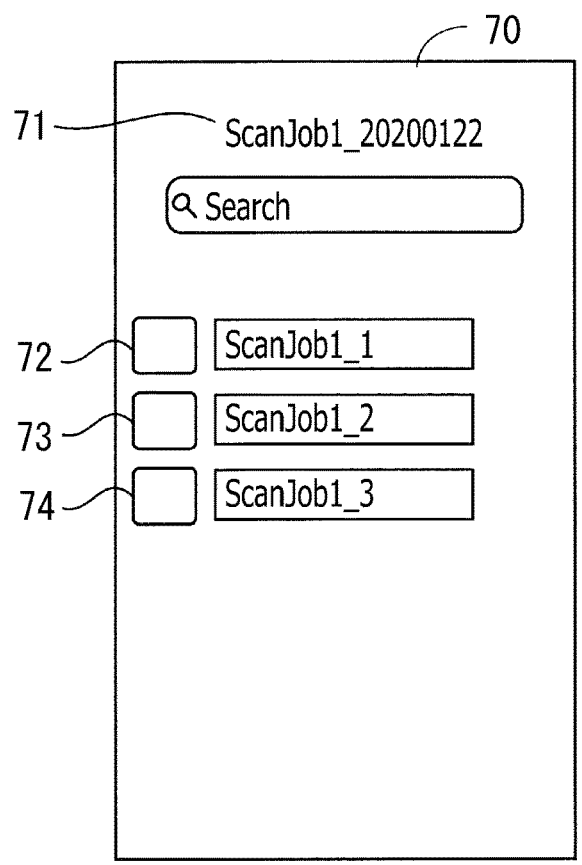
FIG. 8 shows a browser screen including file directory images each displayed in association with a directory name (i.e., a file name) of a corresponding file directory, in the first illustrative embodiment according to one or more aspects of the present disclosure.

FIG. 8 shows an example of a browser screen 70 displayed on the display 13 by the browser program 21 in response to the second directory image 62 being touched on the browser screen 60 (see FIG. 7). The browser screen 70 includes a directory display area 71 and file directory images 72, 73, and 74. The directory display area 71 is for showing the directory name "ScanJob1_20200122" of the second directory D2 specified by the user. Each of the file directory images 72, 73, and 74 is configured to receive a user operation to specify a corresponding one of the file directories D3 that belong to the layer one level lower than the specified second directory D2. In FIG. 8, in the directory display area 71, the directory name "ScanJob1_20200122" of the second directory D2a (see FIG. 4) specified by the user is displayed. The file directory images 72, 73, and 74 correspond to the file directories D3a, D3b, and D3c, respectively, which belong to the layer one level lower than the second directory D2a specified by the user in the hierarchical directory structure (see FIG. 4). In each of the file directory images 72, 73, and 74, the file name of a corresponding one of the file directories D3a, D3b, and D3c is displayed. Specifically, "ScanJob1_1," "ScanJob1_2," and "ScanJob1_3" are displayed in the file directory images 72, 73, and 74, respectively.

When the user touches one of the file directory images 72 to 74, the browser program 21 displays on the display 13 an image file corresponding to the file directory D3 specified by the user.

Figure 9:
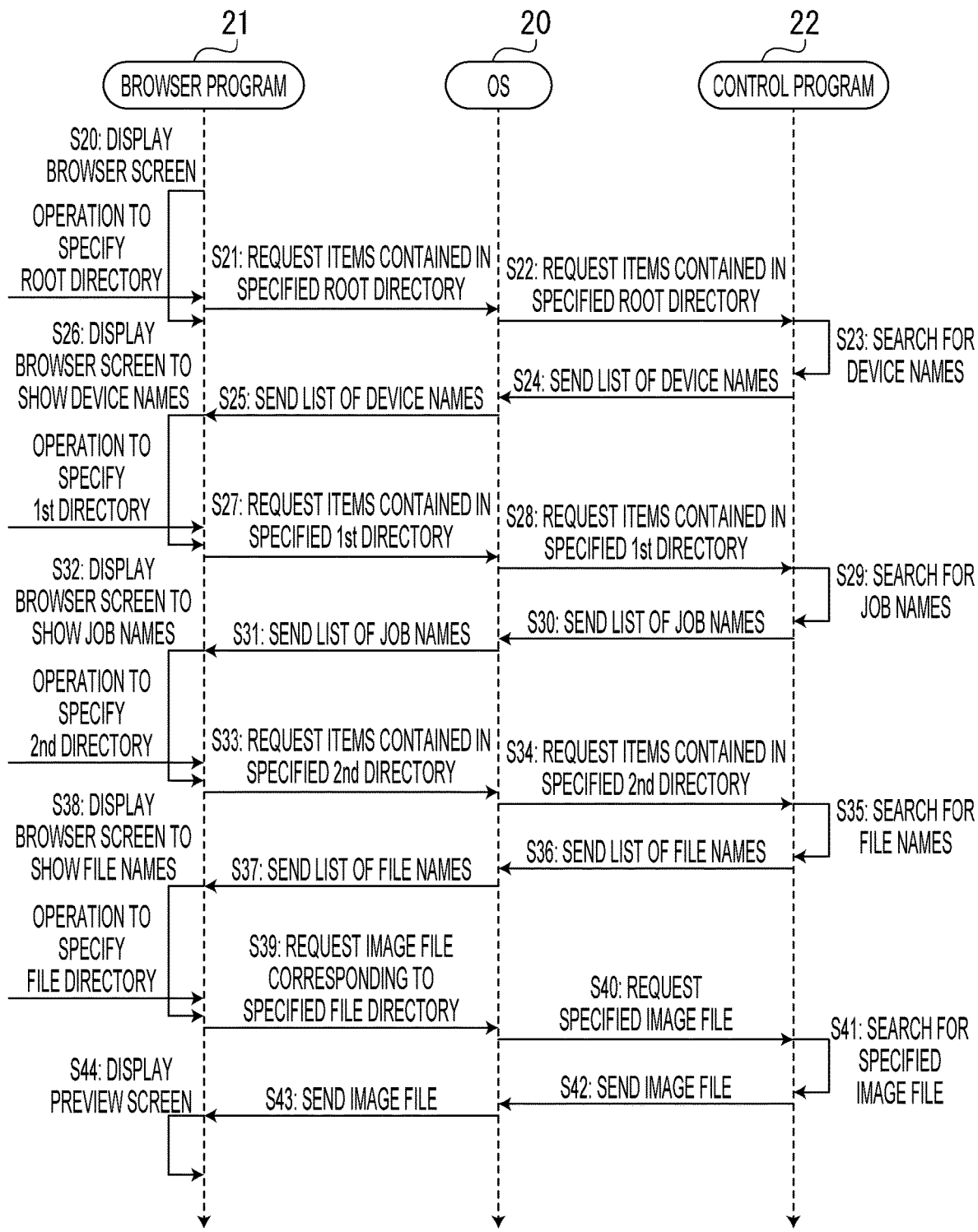
FIG. 9 is a timing chart showing a procedure to display a preview screen for showing an intended image file through sequentially displaying the browser screens, in the first illustrative embodiment according to one or more aspects of the present disclosure.

Next, referring to FIG. 9, a procedure for displaying the aforementioned browser screens 40, 50, 60, and 70 will be described. Processes shown in FIG. 9 are performed by the CPU 12 executing the browser program 21 and the control program 22.

In S20, the browser program 21 displays the browser screen 40 (see FIG. 5) that includes the root directory images 44, 45, and 46, and receives a user operation to specify a root directory Dr. When receiving a user operation of touching the root directory image 46 on the browser screen 40, in S21, the browser program 21 sends to the OS 20 a request for items contained in the root directory Dr specified by the user, with the control program 22 as a destination. In S22, when receiving the request from the browser program 21, the OS 20 sends to the control program 22 a request for the items contained in the root directory Dr.

In S23, when receiving the request from the OS 20, the control program 22 searches for the directory names of the first directories D1 that belong to the layer one level lower than the specified root directory Dr in the hierarchical directory structure (see FIG. 4). In the first illustrative embodiment, the control program 22 stores, in the memory 16, a table (not shown) that defines a relationship between each of the directories D1 to D3 and a corresponding set name (e.g., a device name, a job name, or a file name) in the hierarchical directory structure. Therefore, by referring to the table, the control program 22 searches for the directory names.

In S24, the control program 22 sends to the OS 20 a list of device names retrieved in S23 as the directory names of the first directories D1, as a response to the received request. In S25, when receiving the list of the device names set as the directory names of the first directories D1 from the control program 22, the OS 20 sends the received list of the device names to the browser program 21. In S26, when receiving the list of the device names from the OS 20, the browser program 21 displays the browser screen 50 (see FIG. 6) that includes the first directory images 52 and 53 shown with the received device names as their corresponding directory names.

When receiving a user operation of touching one of the first directory images 52 and 53 to specify a corresponding one of the first directories D1 on the browser screen 50, in S27, the browser program 21 sends to the OS 20 a request for items contained in the specified first directory D1, with the control program 22 as a destination. In S28, when receiving the request from the browser program 21, the OS 20 sends to the control program 22 a request for the items contained in the specified first directory D1.

In S29, when receiving the request from the OS 20, the control program 22 searches for the directory names (i.e., the job names) of the second directories D2 that belong to the layer one level lower than the specified first directory D1 in the hierarchical directory structure (see FIG. 4). In S29 as well, the control program 22 searches for the directory names of the second directories D2 by referring to the table (not shown), in substantially the same manner as in S23.

In S30, the control program 22 sends to the OS 20 the list of the job names retrieved in S29 as the directory names of the second directories D2, as a response to the received request. In S31, when receiving the list of the job names from the control program 22, the OS 20 sends the received list of the job names to the browser program 21. In S32, when receiving the list of the job names from the OS 20, the browser program 21 displays the browser screen 60 (see FIG. 7) that includes the second directory images 62 and 63 shown with the received job names as their corresponding directory names.

When receiving a user operation of touching one of the second directory images 62 and 63 to specify a corresponding one of the second directories D2 on the browser screen 60, in S33, the browser program 21 sends to the OS 20 a request for items contained in the specified second directory D2, with the control program 22 as a destination. In S34, when receiving the request from the browser program 21, the OS 20 sends to the control program 22 a request for the items contained in the specified second directory D2. In S35, when receiving the request from the OS 20, the control program 22 searches for the directory names (i.e., the file names) of the file directories D3 that belong to the layer one level lower than the specified second directory D2 in the hierarchical directory structure (see FIG. 4). In S35 as well, the control program 22 searches for the directory names of the file directories D3 by referring to the table (not shown), in substantially the same manner as in S23.

In S36, the control program 22 sends to the OS 20 a list of file names retrieved in S35 as the directory names of the file directories D3, as a response to the received request. In S37, when receiving the list of the file names from the control program 22, the OS 20 sends the received list of the file names to the browser program 21. In S38, when receiving the list of the file names from the OS 20, the browser program 21 displays the browser screen 70 (see FIG. 8) that includes the file directory images 72 to 74 shown with the received file names as their corresponding directory names.

When receiving a user operation of touching one of the file directory images 72 to 74 to specify a corresponding one of the file directories D3 (i.e., to specify a corresponding image file FD) on the browser screen 70, in S39, the browser program 21 sends to the OS 20 a request for the specified image file FD, with the control program 22 as a destination. In S40, when receiving the request from the browser program 21, the OS 20 sends a request for the specified image file FD to the control program 22. In S41, when receiving the request from the OS 20, the control program 22 searches for the specified image file FD from the memory 16.

In S42, the control program 22 sends the image file FD retrieved in S41 to the OS 20 as a response to the received request. In S43, when receiving the image file FD from the control program 22, the OS 20 sends the received image file FD to the browser program 21. In S44, when receiving the image file FD from the OS 20, the browser program 21 displays a preview screen showing a scan result, using the received image file FD.

The first illustrative embodiment described above produces the following advantageous effects. The CPU 12, according to the control program 22, generates a file path for an image file FD stored in the memory 16. The generated file path has, as elements thereof, virtual directories having respective directory names based on the related information RI of the image file FD. In response to receiving operations via the touch panel 14, the CPU 12, according to the browser program 21, displays on the display 13 the virtual directories included in the generated file path. At this time, when receiving an operation to specify a virtual directory via the touch panel 14, the CPU 12, according to the browser program 21, displays virtual directories or image files included in the virtual directory specified in the file path. Thereby, the browser program 21 is enabled to cause the CPU 12 to display the image file FD according to the hierarchical file path having directory names based on the related information RI of the image file FD. Thus, the user is allowed to cause the information processing device 10 to display the virtual directories or the image files while sequentially tracing the names of the displayed virtual directories, thereby searching for the image file FD. As a result, it is possible to suppress the user-friendliness for causing the information processing device 10 to display the image file FD from being worse when image files are displayed using the file browsing provided by the browser program 21.

The CPU 12 generates the file path for the image file FD that has, as elements thereof, virtual directories each of which has a name including a corresponding one of the items contained in the related information RI of the image file FD. Thereby, a corresponding one of the items contained in the related information RI is included in the name of each virtual directory to be displayed on the display 13. Thus, the user is allowed to easily imagine a relationship between each virtual directory and the image file FD and easily search for the image file FD.

When receiving an operation to specify a virtual directory via the touch panel 14, the browser program 21 sends to the control program 22 a request for the items contained in the specified virtual directory. When receiving from the browser program 21 the request for the items contained in the specified virtual directory, the control program 22 sends the names of the virtual directories or the names of the image files that belong to the layer one level lower than the specified virtual directory on the file path, to the browser program 21 as a response to the request. Thereby, the user is allowed to search for the image file FD by sequentially following the virtual directories that are the elements of the hierarchical file path for the image file FD.

The control program 22 generates a name of each virtual directory with the generation date or the serial number included as information specific to the image file FD. Thereby, the user is allowed to easily distinguish between virtual directories that belong to the same layer in the hierarchical directory structure, since each virtual directory has a directory name that includes specific information as well as the related information RI. As a result, the user is allowed to easily access the intended image file FD by tracing the virtual directories.

The control program 22 stores the device name, which is information for identifying the MFP 30, as an item of the related information RI for the image file FD, and generates a file path that has a name based on the device name of the MFP 30 as the directory name of the first directory D1. Thereby, the user is allowed to search for the intended image file FD via following the first directory D1 having the directory name based on the information for identifying the MFP 30. Therefore, the user is allowed to easily access the intended image file FD.

Modification of First Illustrative Embodiment

Figure 10:
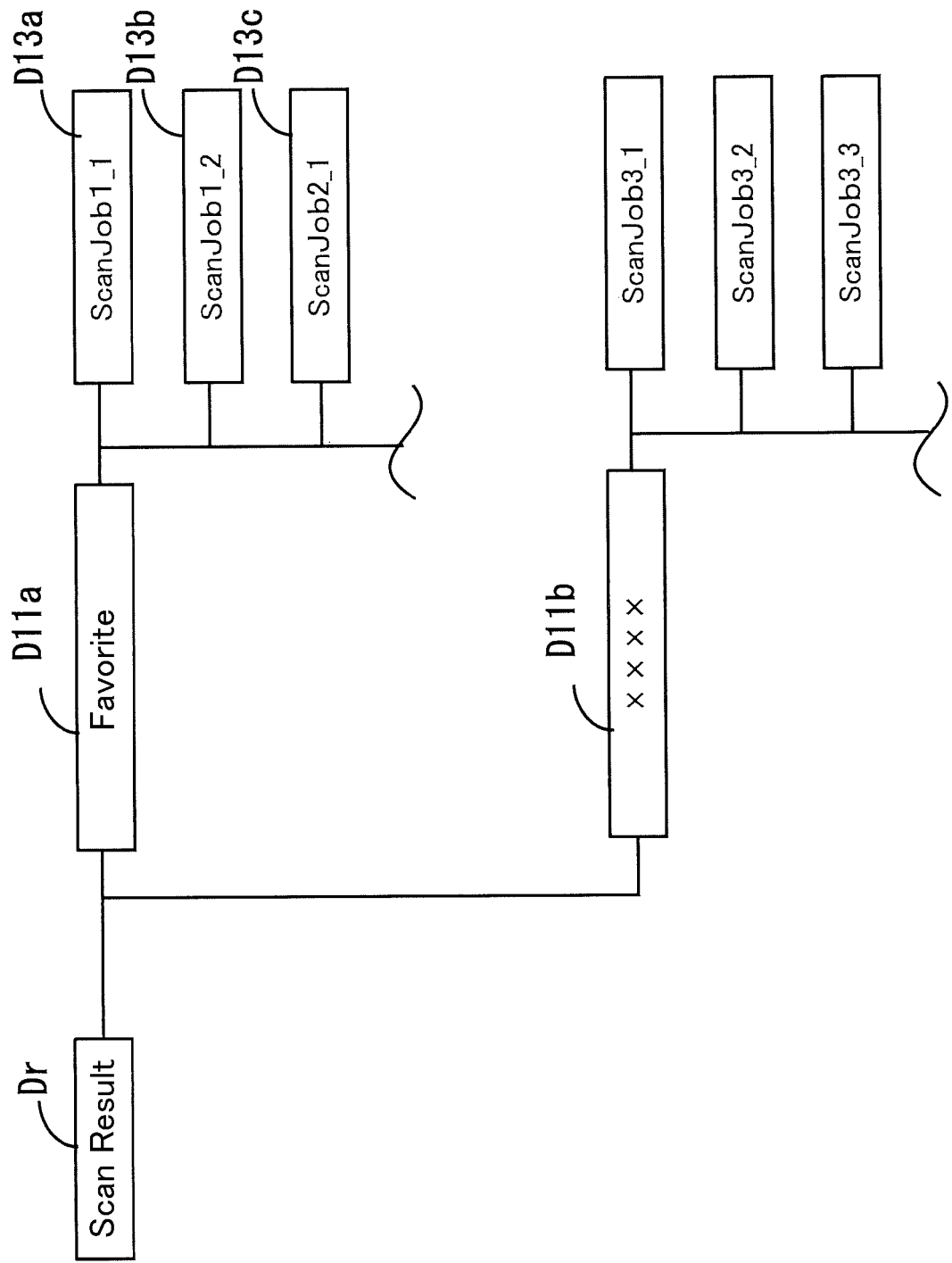
FIG. 10 shows a directory structure including file paths for the image files stored in the information processing device, in a modification of the first illustrative embodiment according to one or more aspects of the present disclosure.

The file path generated by the control program 22 is not limited to the structure shown in FIG. 4. Further, a plurality of file paths may be generated for the same image file FD. FIG. 10 illustrates another file path generated for the image file FD in a modification of the first illustrative embodiment according to aspects of the present disclosure.

A directory structure shown in FIG. 10 is a multi-layered tree structure, i.e., a hierarchical structure that has root directories Dr as a top layer, and further has lower layers such as first directories D11 and file directories D13. In the modification of the first illustrative embodiment, in S16 of FIG. 3, the control program 22 may generate, for the image file FD, a file path included in the directory structure shown in FIG. 10, in addition to the file path included in the directory structure shown in FIG. 4. In substantially the same manner as in the first illustrative embodiment, the root directory Dr shown in FIG. 10 may have, as a directory name thereof, a name "Scan Result" corresponding to the name of the function "Scan Result Display" provided by the control program 22.

A first directory D11a, which belongs to a layer one level lower than the root directory Dr shown in FIG. 10, may have, as a directory name thereof, information representing whether each image file FD included in the first directory D11a is registered with the "Favorite Settings" in the related information RI. In the example shown in FIG. 10, "Favorite" is set as the directory name of the first directory D11a. Namely, in the hierarchical directory structure shown in FIG. 10, the layer, which is one level lower than the first directory D11a, may include the file directories D13 for image files FD each of which is registered with the favorite settings in the corresponding related information RI. Specifically, "ScanJob1_1," "ScanJob1_2," and "ScanJob2_1," which represent file directories D13a, D13b, and D13c, respectively, belonging to a layer one level lower than the first directory D11a, may all be file directories for image files FD each of which is registered with the favorite settings by the user. Here, the file directories with the file names "ScanJob1_1" and "ScanJob1_2" as their respective directory names belong to the layer one level lower than the second directory D2a in the hierarchical directory structure shown in FIG. 4, and also belong to the layer one level lower than the first directory D11a in the hierarchical directory structure shown in FIG. 10. Therefore, the user is allowed to search for the file directory D13a by following any of the file paths shown in FIGS. 4 and 10.

In the modification of the first illustrative embodiment, information representing whether the image file FD is registered with the favorite settings, included in the related information RI, may be an example of "category information" according to aspects of the present disclosure. The category information may be any item or information for categorizing the image file FD. Examples of the category information may include, but are not limited to, an item or information representing that the image file FD is permitted to be viewed by only specific users, and an item or information representing that the image file FD is permitted to be viewed when one or more conditions such as successful authentication are satisfied.

In the modification of the first illustrative embodiment, in S26 of FIG. 9, the browser program 21 may display a first directory image for receiving a user operation to specify the first directory D11a with a directory name "Favorite Settings." Then, when the user touches the first directory image corresponding to the first directory D11a with the directory name "Favorite Settings," the browser program 21 displays a browser screen that includes file directory images corresponding to the file directories D13a, D13b, and D13c with the file names "ScanJob1_1," "ScanJob1_2," and "ScanJob2_1" as their respective directory names.

In the modification of the first illustrative embodiment, the CPU 12 may store the image file FD in association with a plurality of items contained in the related information RI. Further, the CPU may generate, for the same image file FD, a plurality of file paths with respective different combinations of virtual directories as elements of the individual file paths. Thus, the user may search for the image file FD through any of the plurality of file paths associated with respective different combinations of items of the related information RI.

In response to an operation received via the touch panel 14, the control program 22 may store information representing that the image file FD is registered with the favorite settings, in the related information RI, and generate a file path with a virtual directory having a name "Favorite Settings" as an element of the file path. Thereby, it is possible to render image files to be searched for by the control program 22 different depending on which category information is specified for the image file FD (i.e., depending on whether the image file FD is registered with the favorite settings). As a result, it is possible to flexibly change a search range for image files according to the user's preference.

Second Illustrative Embodiment

In a second illustrative embodiment according to aspects of the present disclosure, different configurations from the aforementioned first illustrative embodiment will be mainly described. In the second illustrative embodiment, regarding substantially the same elements as in the first illustrative embodiment, the same reference characters will be provided thereto, and detailed explanations thereof may be omitted.

Figure 11:
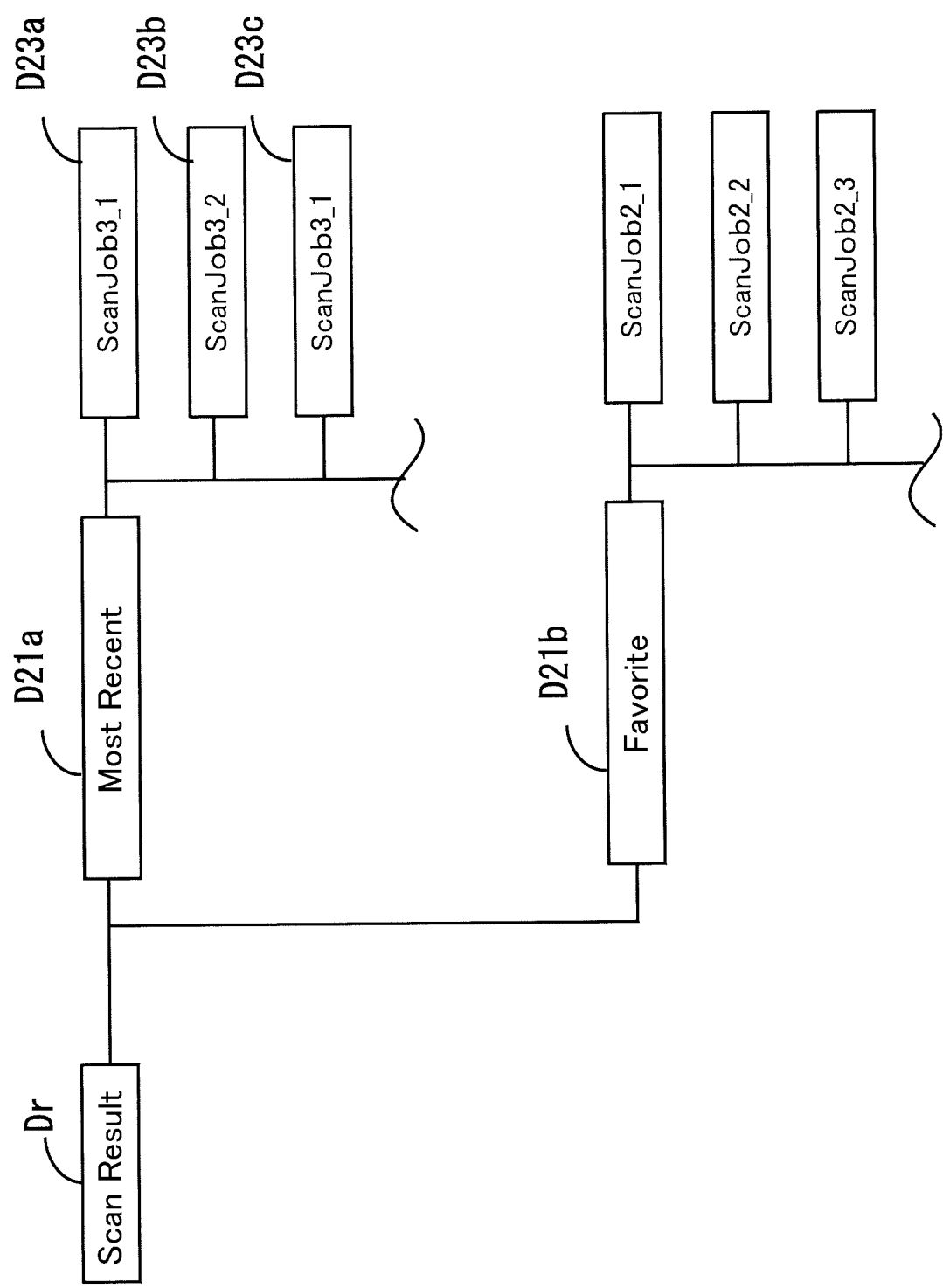
FIG. 11 shows a directory structure including file paths for the image files stored in the information processing device, in a second illustrative embodiment according to one or more aspects of the present disclosure.

In the aforementioned first illustrative embodiment, items contained in the related information RI are used for the directory names of the virtual directories. Instead, in the second illustrative embodiment, a name indicating a period of time within which the image file FD was generated is used for a directory name of a virtual directory. FIG. 11 shows an example of a directory structure in the second illustrative embodiment.

The directory structure shown in FIG. 11 is a multi-layered tree structure, i.e., a hierarchical structure that has root directories Dr as a top layer, and further has lower layers such as first directories D21 and file directories D23. It is noted that FIG. 11 shows only one root directory Dr for the sake of simple illustration, although the directory structure may have a plurality of root directories Dr. For a first directory D21a that belongs to a layer one level lower than the root directory Dr shown in FIG. 11, "Most Recent" is set as a directory name thereof. All image files FD, which correspond to the file directories D23 belonging to a layer one level lower than the first directory D21a, are image files FD generated by the MFP 30 within a most recent particular period of time from the present time. More specifically, in the second illustrative embodiment, each image file FD is an image file generated by the MFP 30 within the most recent one week from the present time. Therefore, a date and time within the most recent one week from the present time is stored as the generation date and time in the related information RI of each image file FD belonging to the file directories D23. For the first directory D21b, "Favorite" is set as a directory name thereof.

In the second illustrative embodiment, each of the image files FD belonging to the layer one level lower than the first directory D21a is an image file having the generation date and time indicating that the image file was generated within the most recent one week from the present time. However, for instance, the length of the period may be set according to a user operation in S16 of FIG. 3. Further, the directory name of the first directory D21a is not limited to "Most Recent," but may be any name as long as it indirectly indicates the date and time when the image file FD was generated.

Figure 12:
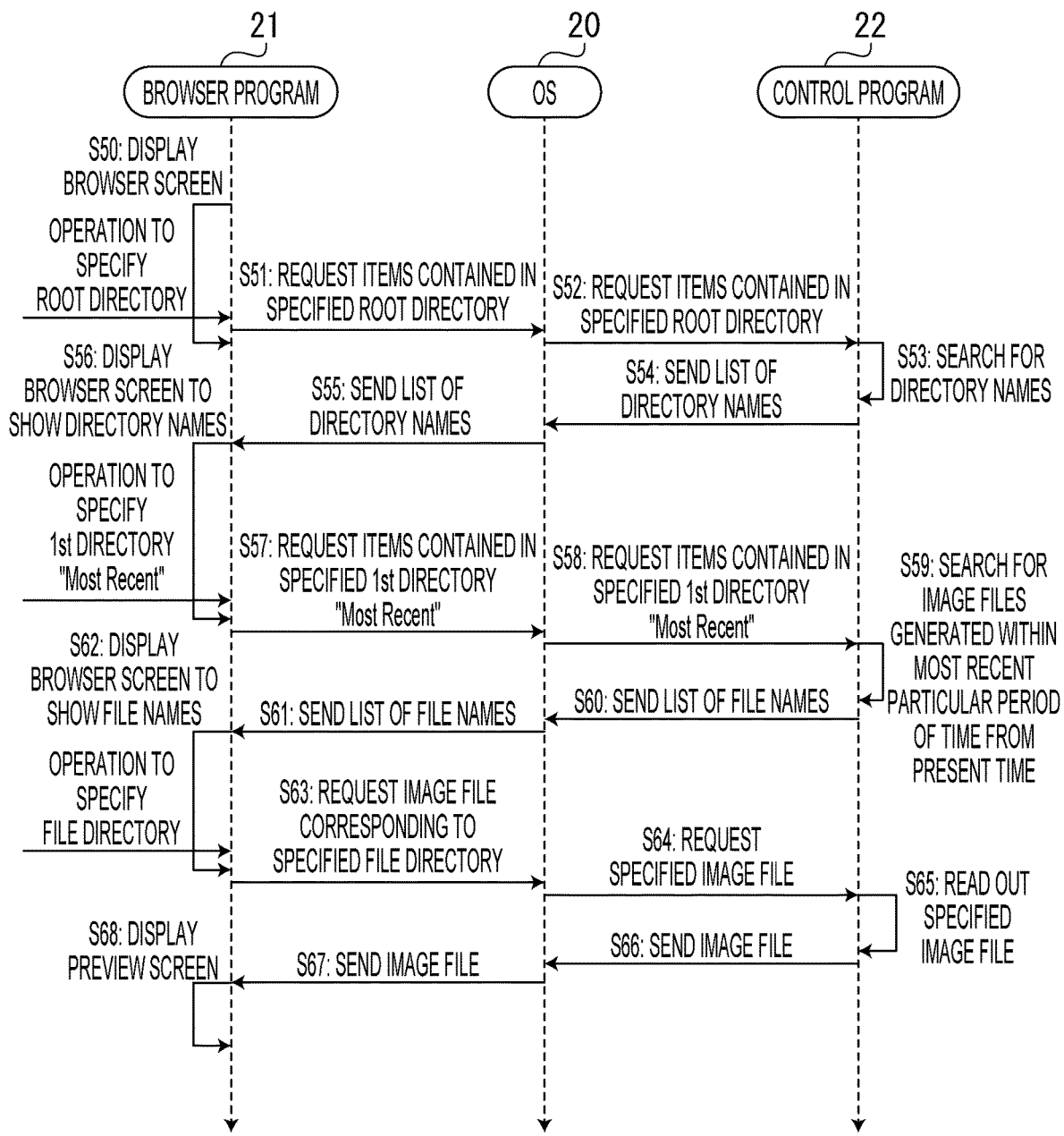
FIG. 12 is a timing chart showing a procedure to display a preview screen for showing an intended image file through sequentially displaying browser screens, in the second illustrative embodiment according to one or more aspects of the present disclosure.

Subsequently, referring to FIG. 12, a procedure for displaying each browser screen by the browser program 21 will be described. Processes shown in FIG. 12 are performed by the CPU 12 executing the browser program 21 and the control program 22.

In S50, the browser program 21 displays a browser screen 40 (e.g., see FIG. 5) that includes root directory images 44, 45, and 46, and receives a user operation to specify a root directory Dr. When receiving a user operation of touching the root directory image 46, in S51, the browser program 21 sends to the OS 20 a request for the items contained in the specified root directory Dr, with the control program 22 as a destination. When receiving the request from the browser program 21, in S52, the OS 20 sends to the control program 22 a request for the items contained in the specified root directory Dr. When receiving the request from the OS 20, in S53, the control program 22 searches for the directory names of the first directories D1 that belong to the layer one level lower than the specified root directory Dr. In the second illustrative embodiment, the directory names "Most Recent" and "Favorite" shown in FIG. 11 are retrieved as search results.

In S54, the control program 22 sends to the OS 20 the list of the directory names of the first directories D1 retrieved in S53, as a response to the received request. Specifically, in the second illustrative embodiment, the control program 22 sends the directory names "Most Recent" and "Favorite" to the OS 20. In S55, when receiving the list of the directory names of the first directories D1 from the control program 22, the OS 20 sends the received list of the directory names to the browser program 21.

When receiving the list of the directory names from the OS 20, in S56, the browser program 21 displays a browser screen 50 that includes first directory images 52 and 53 shown in association with the received directory names. When receiving a user operation to specify the first directory D21a with the name "Most Recent" on the browser screen 50, in S57, the browser program 21 sends to the OS 20 a request for the items contained in the specified first directory D21a with the name "Most Recent," with the control program 22 as a destination. In S58, when receiving the request from the browser program 21, the OS 20 sends to the control program 22 a request for the items contained in the specified first directory D21 having the name "Most Recent."

When receiving the request from the OS 20, in S59, the control program 22 searches for the image files FD each having the generation date and time that is within the most recent one week from the present time. Specifically, by referring to the generation date and time of the related information RI of each image file FD stored in the memory 16, the control program 22 searches for the image files FD each of which has the generation date and time that is within the most recent one week from the present time.

In S60, the control program 22 sends to the OS 20 a list of file names of the image files FD retrieved in S59, as a response to the received request. When receiving the list of the file names from the control program 22, in S61, the OS 20 sends the received list of the file names to the browser program 21. When receiving the list of the file names from the OS 20, in S62, the browser program 21 displays a browser screen that includes file directory images shown in association with the received file names. In the example shown in FIG. 11, the browser screen displays thereon the file directory images with the file names "ScanJob3_1," "ScanJob3_2," and "ScanJob3_1" as their corresponding directory names.

When receiving a user operation of touching one of the file directory images to specify a corresponding one of the file directories D23 (i.e., to specify an image file FD) on the browser screen 70, in S63, the browser program 21 sends to the OS 20 a request for the specified image file FD, with the control program 22 as a destination. A process of S64 to S67 is substantially the same as the process of S40 to S43 in FIG. 9. Hence, a detailed explanation of the process of S64 to S67 will be omitted. In S68, when receiving the image file FD from the OS 20, the browser program 21 displays a preview screen showing the scan result, using the received image file FD.

In the second illustrative embodiment described above, when the virtual directory D21a with the name "Most Recent" is specified in response to an operation via the touch panel 14, the control program 22 causes the browser program 21 to display image files FD each having the generation date and time stored in the related information RI that is within a most recent particular period of time from the present time. Thereby, the user is allowed to search for the image files FD that were generated within the most recent particular period of time from the present time, using a keyword or information indicating the generation date and time when each of the image files FD was generated. Thus, it is possible to improve user-friendliness for the user to search for an intended image file FD.

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

Modifications

The directory name of each virtual directory may be a name based on the related information RI. For instance, the directory name of each virtual directory may be any information that indirectly indicates information contained in the related information RI, other than the aforementioned information for categorizing the image files FD and the aforementioned information that indirectly indicates the generation date when each of the image files FD was generated.

The number of layers in the hierarchical directory structure of each file path generated by the control program 22 is not limited to the numbers exemplified in the aforementioned illustrative embodiments, but may be any number as long as the hierarchical directory structure has two or more layers including the root directory as the top layer.

In the aforementioned illustrative embodiments, the information processing device 10 manages the image files FD on the memory 16. Instead, the information processing device 10 may manage the image files FD on a server connected with the network 200.

The aforementioned illustrative embodiments have been described with the MFP 30 as an example of an image processing device according to aspects of the present disclosure. However, the image processing device may be any device as long as it is configured to generate an image file FD and transmit the generated image file FD via the network 200. For instance, the image processing device may be an image scanner without any equivalent of the print engine 33.

The following shows examples of associations between elements exemplified in the aforementioned illustrative embodiments and modifications and elements according to aspects of the present disclosure. The MFP 30 may be an example of an "image processing device" according to aspects of the present disclosure. The touch panel 14 may be an example of an "input interface" according to aspects of the present disclosure. The CPU 12 may be an example of a "processor" according to aspects of the present disclosure. The memory 16 may be an example of a "memory" according to aspects of the present disclosure. The memory 16 storing the control program 22 may be an example of a "non-transitory computer-readable medium" storing "computer-readable control program instructions" according to aspects of the present disclosure. The CPU 12 and the memory 16 storing computer-readable instructions such as the OS 20, the browser program 21, and the control program 22 may be included in a "controller" according to aspects of the present disclosure. The browser program 21 may be an example of "browser program instructions" according to aspects of the present disclosure. The display 13 may be an example of a "display" according to aspects of the present disclosure.

What is claimed is:

1. A non-transitory computer-readable medium storing computer-readable control program instructions executable by a processor of an information processing device comprising an input interface, a display, and a memory storing computer-readable browser program instructions, the control program instructions being configured to, when executed by the processor, cause the information processing device to:
    obtain an image file generated by an image processing device;
    store the obtained image file in association with related information of the image file; and
    generate a file path for the image file, the file path including, as elements thereof, a plurality of virtual directories based on the related information, the plurality of virtual directories belonging to respective different hierarchical layers, the file path including identification information of the image file as a virtual directory belonging to a lowest layer,
    wherein the browser program instructions are configured to, when executed by the processor, cause the information processing device to:
        display on the display one or more virtual directories belonging to a top layer; and
        when receiving via the input interface an operation to specify a virtual directory included in the file path for the image file from among the displayed one or more virtual directories belonging to the top layer, send to the control program instructions a request for one or more virtual directories belonging to a first lower layer that is hierarchically one level lower than the specified virtual directory in the top layer, and
    wherein the control program instructions are further configured to, when executed by the processor, cause the information processing device to:
        in response to receipt of the request for the one or more virtual directories belonging to the first lower layer, retrieve the requested one or more virtual directories and send the retrieved one or more virtual directories to the browser program instructions, thereby enabling the browser program instructions to cause the information processing device to display the one or more virtual directories belonging to the first lower layer.

2. The non-transitory computer-readable medium according to claim 1,
    wherein the browser program instructions are further configured to, when executed by the processor, cause the information processing device to:
        if the first lower layer is the lowest layer, when receiving via the input interface an operation to specify the identification information for the image file from the displayed one or more virtual directories belonging to the lowest layer, send to the control program instructions a request for the image file identified by the specified identification information; and
        if the first lower layer is not the lowest layer, when receiving via the input interface an operation to specify a virtual directory of the file path for the image file from the displayed one or more virtual directories belonging to the first lower layer, send to the control program instructions a request for one or more virtual directories belonging to a second lower layer that is hierarchically one level lower than the specified virtual directory in the first lower layer, and
    wherein the control program instructions are further configured to, when executed by the processor, cause the information processing device to:
        if the first lower layer is the lowest layer, in response to receipt of the request for the image file identified by the specified identification information, retrieve the requested image file and send the retrieved image file to the browser program instructions, thereby enabling the browser program instructions to cause the information processing device to display the image file on the display; and
        if the first lower layer is not the lowest layer, in response to receipt of the request for the one or more virtual directories belonging to the second lower layer, retrieve the requested one or more virtual directories and send the retrieved one or more virtual directories to the browser program instructions, thereby enabling the browser program instructions to cause the information processing device to display the one or more virtual directories belonging to the second lower layer.

3. The non-transitory computer-readable medium according to claim 1,
    wherein the control program instructions are further configured to, when executed by the processor, cause the information processing device to:
        generate, for the image file, the file path including a virtual directory that has a directory name based on information contained in the related information.

4. The non-transitory computer-readable medium according to claim 1,
    wherein the control program instructions are further configured to, when executed by the processor, cause the information processing device to:
        store the obtained image file in association with a plurality of pieces of information contained in the related information; and
        generate, for the image file, a plurality of file paths including respective different virtual directories.

5. The non-transitory computer-readable medium according to claim 1,
wherein the control program instructions are further configured to, when executed by the processor, cause the information processing device to:
generate, for the image file, the file path including a virtual directory that has a directory name based on information specific to the image file.

6. The non-transitory computer-readable medium according to claim 1,
wherein the control program instructions are further configured to, when executed by the processor, cause the information processing device to:
in response to an operation received via the input interface, store the obtained image file in association with category information contained in the related information, the category information representing that the image file belongs to a particular category; and
generate, for the image file, the file path including a virtual directory that has a directory name based on the category information.

7. The non-transitory computer-readable medium according to claim 1,
wherein the control program instructions are further configured to, when executed by the processor, cause the information processing device to:
store the obtained image file in association with device identification information contained in the related information, the device identification information identifying the image processing device; and
generate, for the image file, the file path including a virtual directory that has a directory name based on the device identification information.

8. The non-transitory computer-readable medium according to claim 1,
wherein the image processing device comprises a scan engine configured to perform a scanning operation to scan an image recorded on a document and generate scanned data, and
wherein the control program instructions are further configured to, when executed by the processor, cause the information processing device to:
cause the scan engine to perform the scanning operation; and
obtain, as the image file, the scanned data generated in the scanning operation.

9. The non-transitory computer-readable medium according to claim 1,
wherein the control program instructions are further configured to, when executed by the processor, cause the information processing device to:
store the obtained image file in association with date and time information contained in the related information, the date and time information representing a date and time when the image file was generated; and
generate, for the image file, the file path including a virtual directory that has a directory name representing a particular period of time including the date and time represented by the date and time information,
wherein the browser program instructions are further configured to, when executed by the processor, cause the information processing device to:
when receiving via the input interface an operation to specify the virtual directory having the directory name representing the particular period of time, send to the control program instructions an image file request for one or more image files each of which is associated with date and time information representing a date and time included in the particular period of time, and
wherein the control program instructions are further configured to, when executed by the processor, cause the information processing device to:
in response to receipt of the image file request, retrieve the requested one or more image files and send the retrieved one or more image files to the browser program instructions, thereby enabling the browser program to cause the information processing device to display the one or more image files on the display.

10. An information processing device comprising:
an input interface;
a display; and
a controller comprising:
a processor; and
a memory storing computer-readable control program instructions and computer-readable browser program instructions,
wherein the control program instructions are configured to, when executed by the processor, cause the controller to:
obtain an image file;
store the obtained image file in association with related information of the image file; and
generate a file path for the image file, the file path including, as elements thereof, a plurality of virtual directories based on the related information, the plurality of virtual directories belonging to respective different hierarchical layers, the file path including identification information of the image file as a virtual directory belonging to a lowest layer,
wherein the browser program instructions are configured to, when executed by the processor, cause the controller to:
display on the display one or more virtual directories belonging to a top layer; and
when receiving via the input interface an operation to specify a virtual directory included in the file path for the image file from among the displayed one or more virtual directories belonging to the top layer, send to the control program instructions a request for one or more virtual directories belonging to a first lower layer that is hierarchically one level lower than the specified virtual directory in the top layer, and
wherein the control program instructions are further configured to, when executed by the processor, cause the controller to:
in response to receipt of the request for the one or more virtual directories belonging to the first lower layer, retrieve the requested one or more virtual directories and send the retrieved one or more virtual directories to the browser program, thereby enabling the browser program to cause the controller to display the one or more virtual directories belonging to the first lower layer.

11. The information processing device according to claim 10,
wherein the browser program instructions are further configured to, when executed by the processor, cause the controller to:
if the first lower layer is the lowest layer, when receiving via the input interface an operation to specify the identification information for the image file from the displayed one or more virtual directories belonging to the lowest layer, send to the control program instructions a request for the image file identified by the specified identification information; and if the first lower layer is not the lowest layer, when receiving via the input interface an operation to specify a virtual directory of the file path for the image file from the displayed one or more virtual directories belonging to the first lower layer, send to the control program instructions a request for one or more virtual directories belonging to a second lower layer that is hierarchically one level lower than the specified virtual directory in the first lower layer, and wherein the control program instructions are further configured to, when executed by the processor, cause the controller to:

if the first lower layer is the lowest layer, in response to receipt of the request for the image file identified by the specified identification information, retrieve the requested image file and send the retrieved image file to the browser program instructions, thereby enabling the browser program instructions to cause the controller to display the image file on the display; and if the first lower layer is not the lowest layer, in response to receipt of the request for the one or more virtual directories belonging to the second lower layer, retrieve the requested one or more virtual directories and send the retrieved one or more virtual directories to the browser program instructions, thereby enabling the browser program instructions to cause the controller to display the one or more virtual directories belonging to the second lower layer.

12. A method implementable on a processor of an information processing device comprising an input interface, a display, and a memory storing computer-readable control program instructions and computer-readable browser program instructions, the method comprising:

by executing the control program instructions, performing:

obtaining an image file;

storing the obtained image file in association with related information of the image file; and generating a file path for the image file, the file path including, as elements thereof, a plurality of virtual directories based on the related information, the plurality of virtual directories belonging to respective different hierarchical layers, the file path including identification information of the image file as a virtual directory belonging to a lowest layer;

by executing the browser program instructions, performing:

displaying on the display one or more virtual directories belonging to a top layer; and when receiving via the input interface an operation to specify a virtual directory included in the file path for the image file from among the displayed one or more virtual directories belonging to the top layer, sending to the control program instructions a request for one or more virtual directories belonging to a first lower layer that is hierarchically one level lower than the specified virtual directory in the top layer; and by executing the control program instructions, further performing:

in response to receipt of the request for the one or more virtual directories belonging to the first lower layer, retrieving the requested one or more virtual directories and sending the retrieved one or more virtual directories to the browser program, thereby enabling the processor to, by executing the browser program, display the one or more virtual directories belonging to the first lower layer.

13. The method according to claim 12, further comprising:

by executing the browser program instructions, performing:

if the first lower layer is the lowest layer, when receiving via the input interface an operation to specify the identification information for the image file from the displayed one or more virtual directories belonging to the lowest layer, sending to the control program instructions a request for the image file identified by the specified identification information; and if the first lower layer is not the lowest layer, when receiving via the input interface an operation to specify a virtual directory of the file path for the image file from the displayed one or more virtual directories belonging to the first lower layer, sending to the control program instructions a request for one or more virtual directories belonging to a second lower layer that is hierarchically one level lower than the specified virtual directory in the first lower layer; and by executing the control program instructions, performing:

if the first lower layer is the lowest layer, in response to receipt of the request for the image file identified by the specified identification information, retrieving the requested image file and sending the retrieved image file to the browser program instructions, thereby enabling the processor to, by executing the browser program instructions, display the image file on the display; and if the first lower layer is not the lowest layer, in response to receipt of the request for the one or more virtual directories belonging to the second lower layer, retrieving the requested one or more virtual directories and sending the retrieved one or more virtual directories to the browser program instructions, thereby enabling the processor to, by executing the browser program instructions, to display the one or more virtual directories belonging to the second lower layer.

* * * * *